(12) United States Patent
Meier et al.

(10) Patent No.: US 10,899,189 B2
(45) Date of Patent: Jan. 26, 2021

(54) COMPRESSED AIR SUPPLY SYSTEM

(71) Applicant: WABCO Europe BVBA, Brussels (BE)

(72) Inventors: Joerg Meier, Hessisch Oldendorf (DE); Uwe Stabenow, Laatzen (DE); Christoph Stuenkel, Wunstorf (DE)

(73) Assignee: WABCO EUROPE BVBA, Brussels (BE)

( * ) Notice: Subject to any disclaimer, the term of this patent is extended or adjusted under 35 U.S.C. 154(b) by 127 days.

(21) Appl. No.: 16/081,920

(22) PCT Filed: Feb. 6, 2017

(86) PCT No.: PCT/EP2017/000159
§ 371 (c)(1),
(2) Date: Sep. 3, 2018

(87) PCT Pub. No.: WO2017/167428
PCT Pub. Date: Oct. 5, 2017

(65) Prior Publication Data
US 2019/0061459 A1   Feb. 28, 2019

(30) Foreign Application Priority Data

Mar. 30, 2016   (DE) .......... 10 2016 003 661

(51) Int. Cl.
*B60G 17/052* (2006.01)
*F15B 21/048* (2019.01)

(52) U.S. Cl.
CPC ..... *B60G 17/0528* (2013.01); *B60G 17/0523* (2013.01); *F15B 21/048* (2013.01);
(Continued)

(58) Field of Classification Search
CPC ............ B60G 17/0528; B60G 17/0523; B60G 2500/2012; B60G 2500/2021;
(Continued)

(56) References Cited

U.S. PATENT DOCUMENTS 5,452,919 A * 9/1995 Hoyle ............... B60G 17/0155
                                                    280/5.505
6,354,617 B1 * 3/2002 Behmenburg ..... B60G 17/0523
                                                    137/100
(Continued)

FOREIGN PATENT DOCUMENTS

DE   102010054710 A1   6/2012
DE   102011109500 A1   6/2012
(Continued)

*Primary Examiner* — Timothy Wilhelm
(74) *Attorney, Agent, or Firm* — Leydig, Voit & Mayer, Ltd.

(57) ABSTRACT

A compressed-air feed system for operating a pneumatic system includes a compressed-air supply, a compressed-air connection to the pneumatic system, at least one ventilation connection to surroundings, and a pneumatic main line between the compressed-air supply and the compressed-air connection. The pneumatic main line has an air dryer and a regeneration throttle. The compressed-air feed system further includes a first ventilation line between the pneumatic main line and the at least one ventilation connection. The first ventilation line has a first ventilation valve and a ventilation throttle. The compressed-air feed system additionally includes a second ventilation line between the compressed-air connection and the at least one ventilation connection. The second ventilation line has a second ventilation valve formed as a 2/2 directional valve. The compressed-air feed system is designed to provide an operating mode in which the second ventilation valve is open over a predetermined time period.

20 Claims, 3 Drawing Sheets

(52) U.S. Cl.
CPC .. *B60G 2300/07* (2013.01); *B60G 2500/2012* (2013.01); *B60G 2500/2021* (2013.01); *B60G 2500/2044* (2013.01); *B60G 2600/66* (2013.01); *F15B 2211/40592* (2013.01); *F15B 2211/411* (2013.01); *F15B 2211/41563* (2013.01); *F15B 2211/50536* (2013.01); *F15B 2211/511* (2013.01); *F15B 2211/526* (2013.01); *F15B 2211/8616* (2013.01); *F15B 2211/8855* (2013.01)

(58) Field of Classification Search
CPC ........ B60G 2500/2044; B60G 2600/66; B60G 2300/07; F15B 21/048; F15B 2211/40592; F15B 2211/411; F15B 2211/41563; F15B 2211/50536; F15B 2211/511; F15B 2211/526; F15B 2211/8616; F15B 2211/8855
See application file for complete search history.

(56) References Cited

U.S. PATENT DOCUMENTS

| | | | | |
|---|---|---|---|---|
| 6,666,078 B1* | 12/2003 | Claussen | ............... | B60C 23/003 73/146 |
| 6,726,224 B2* | 4/2004 | Jurr | ................... | B60G 17/0523 280/124.16 |
| 6,752,402 B2* | 6/2004 | Grotendorst | ........... | B60G 11/27 280/5.507 |
| 6,817,600 B2* | 11/2004 | Ocker | ................ | B60G 17/0523 267/274 |
| 6,824,145 B2* | 11/2004 | Behmenburg | .......... | B60C 23/10 152/416 |
| 8,777,246 B2* | 7/2014 | Meier | ................ | B60G 17/0523 280/124.16 |
| 8,814,190 B2* | 8/2014 | Becher | ............... | B60G 17/0565 280/124.16 |
| 8,899,598 B2* | 12/2014 | Frank | .................. | F16K 31/0658 280/5.514 |
| 9,010,785 B2* | 4/2015 | Gocz | ................... | B60G 17/052 280/124.16 |
| 9,062,571 B2* | 6/2015 | Frank | ........................ | F01L 1/34 |
| 9,199,524 B2* | 12/2015 | Stabenow | .......... | B60G 17/0525 |
| 9,371,063 B2* | 6/2016 | Schnittger | ............. | B60T 13/662 |
| 9,505,495 B2* | 11/2016 | Tobias | ..................... | B64D 1/12 |
| 9,764,278 B2* | 9/2017 | Bergemann | .......... | F15B 21/048 |
| 9,833,736 B2* | 12/2017 | Brinkmann | .......... | B01D 53/261 |
| 9,926,994 B2* | 3/2018 | Frank | ................. | B60G 17/0155 |
| 10,017,025 B2* | 7/2018 | Reuter | ................ | B60G 17/056 |
| 10,343,479 B2* | 7/2019 | Bodet | .................. | F15B 21/048 |
| 10,391,830 B2* | 8/2019 | Bohn | ................. | B60G 17/0155 |
| 2002/0153688 A1 | 10/2002 | Jurr et al. | | |
| 2013/0195682 A1* | 8/2013 | Becher | ..................... | F04B 7/02 417/53 |
| 2013/0255787 A1* | 10/2013 | Frank | ................. | B60G 17/0523 137/1 |
| 2013/0257007 A1* | 10/2013 | Frank | ................. | B60G 17/0523 280/124.161 |
| 2013/0276899 A1* | 10/2013 | Frank | ................. | B60G 17/0523 137/1 |
| 2013/0318954 A1* | 12/2013 | Frank | ................. | B60G 17/0155 60/407 |
| 2013/0320645 A1* | 12/2013 | Gall | ....................... | B60G 11/27 280/124.16 |
| 2015/0345490 A1 | 12/2015 | Bremeier et al. | | |

FOREIGN PATENT DOCUMENTS

| | | |
|---|---|---|
| DE | 102012005345 A1 | 6/2013 |
| DE | 102012024400 A1 | 6/2014 |
| EP | 1165333 B2 | 12/2003 |
| EP | 2123343 A1 | 11/2009 |
| WO | WO 2016026577 A1 | 2/2016 |

\* cited by examiner

COMPRESSED AIR SUPPLY SYSTEM

CROSS REFERENCE TO RELATED APPLICATIONS

This application is a U.S. National Stage Application under 35 U.S.C. § 371 of International Application No. PCT/EP2017/000159 filed on Feb. 6, 2017, and claims benefit to German Patent Application No. DE 10 2016 003 661.3 filed on Mar. 30, 2016. The International Application was published in German on Oct. 5, 2017 as WO 2017/167428 A1 under PCT Article 21(2).

FIELD

The invention relates to a compressed-air feed system for operating a pneumatic system, in particular an air suspension system of a vehicle. The invention also relates to a pneumatic system having a compressed-air feed system, to a method for operating a compressed-air feed system and/or a pneumatic system, in particular an air suspension system of a vehicle, and to a device for open-loop and/or closed-loop control of a compressed-air feed system and/or of a pneumatic system.

BACKGROUND

A compressed-air feed system is used in vehicles of all types, in particular for feeding compressed air to an air suspension system of a vehicle. Air suspension systems may also comprise ride-height control devices with which the distance between a vehicle axle and vehicle body can be adjusted. An air suspension system of a pneumatic system mentioned in the introduction comprises a number of air bellows which are pneumatically connected to a common line (gallery) which, with increasing filling, can raise the vehicle body and, with decreasing filling, can correspondingly lower said vehicle body. With increasing distance between the vehicle axle and vehicle body, or ground clearance, the spring travels become longer, and it is also possible for greater ground unevennesses to be traveled over without contact with the vehicle body occurring. Such systems are preferably used in off-road vehicles and sport utility vehicles (SUVs). In the case of SUVs in particular, in the case of very high-powered engines, it is desirable for the vehicle to be equipped, on the one hand, with a relatively small ground clearance for high speeds on roads, and to be equipped, on the other hand, with a relatively large ground clearance for off-road travel. It is furthermore desirable for a change in the ground clearance to be implemented as quickly as possible, which increases the demands with regard to speed, flexibility and reliability of a compressed-air feed system.

DE 10 2011 109 500 A1 describes a compressed-air feed unit for operating a pneumatic system, which compressed-air feed unit has a compressed-air supply, a compressed-air connection to the pneumatic system, and a ventilation connection to the surroundings. Also described are a first pneumatic interconnection between the compressed-air supply and the compressed-air connection, and a second pneumatic interconnection between the compressed-air connection and the ventilation connection. Here, in addition to a ventilation valve in the second pneumatic interconnection, provision is additionally made for an isolating valve of the first pneumatic interconnection to be formed with a pneumatically unblockable check valve, wherein both the ventilation valve and the unblockable check valve are controlled jointly by means of one control valve.

EP 1 165 333 B2 describes an air suspension system for a motor vehicle having a compressor unit. Here, the air suspension system has, in addition to a main ventilation line which can be shut off or opened up, a high-pressure ventilation line, which can be separately shut off by means of a ventilation valve. The high-pressure ventilation line should imperatively be closed by means of a valve after the expiry of a short time period after which the absolute pressure peak values have already been depleted, such that the further residual ventilation takes place via the main ventilation line. In order to deplete only the absolute pressure peak values in the short time period, the high-pressure ventilation line has a considerably smaller free throughflow cross section, and is thus provided as a quasi-throttled high-pressure ventilation line only for the initial pressure reduction, in order that there is no risk of disturbing generation of noise.

SUMMARY

In an embodiment, the present invention provides a compressed-air feed system for operating a pneumatic system. The compressed-air feed system includes a compressed-air supply, a compressed-air connection to the pneumatic system, at least one ventilation connection to surroundings, and a pneumatic main line between the compressed-air supply and the compressed-air connection. The pneumatic main line has an air dryer and a regeneration throttle. The compressed-air feed system further includes a first ventilation line between the pneumatic main line and the at least one ventilation connection. The first ventilation line has a first ventilation valve and a ventilation throttle. The compressed-air feed system additionally includes a second ventilation line between the compressed-air connection and the at least one ventilation connection. The second ventilation line has a second ventilation valve formed as a 2/2 directional valve. The compressed-air feed system is designed to provide at least one operating mode in which the second ventilation valve is open over a predetermined time period of a ventilation process.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
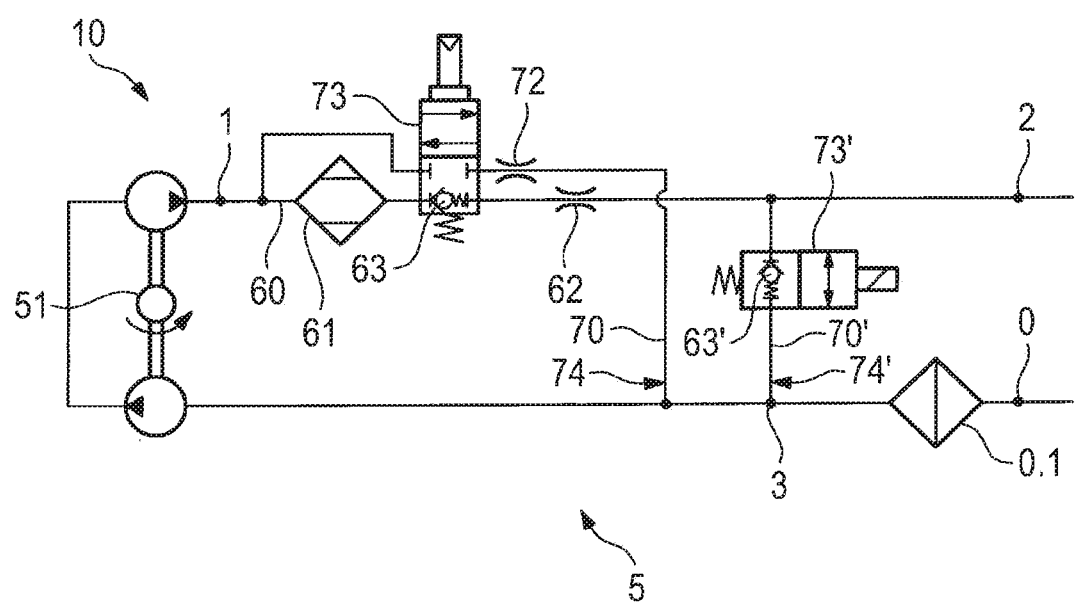
FIG. 1 shows a first embodiment of a compressed-air feed system according to a first aspect of the invention, having a two-stage compressor, having a 4/2 directional check valve as first ventilation valve, and having a 2/2 directional check valve as second ventilation valve.

Embodiments of the present invention provide improved compressed-air feed systems, which ensure an improved, in particular faster, ventilation process. It is sought to ensure this in particular for a lowering of the vehicle. It is advantageously nevertheless sought for a generation of noise during a ventilation process to be kept low. In particular, it is nevertheless sought for an advantageous regeneration of an air dryer to be achieved.

According to a first aspect of the invention, a compressed-air feed system for operating a pneumatic system, in particular an air suspension system of a vehicle, is provided, wherein the compressed-air feed system has: a compressed-air supply, a compressed-air connection to the pneumatic system, at least one ventilation connection to the surroundings, a pneumatic main line between the compressed-air supply and the compressed-air connection, which pneumatic main line has an air dryer and a regeneration throttle, a first ventilation line between the pneumatic main line and a first ventilation connection, which first ventilation line has a first ventilation valve and a ventilation throttle, a second ventilation line between the compressed-air connection and a ventilation connection, wherein the second ventilation line has an additional, second ventilation valve, which is formed as a 2/2 directional valve, wherein the compressed-air feed system is designed to provide at least one operating mode in which the second ventilation valve is open over a predetermined, in particular over an entire, time period of a ventilation process.

An advantage of the first aspect of the invention thus lies in the fact that an additional valve and a corresponding additional line are installed into the compressed-air feed system in order to ensure a faster ventilation of the pneumatic system.

The ventilation via the additional, second ventilation valve may take place here for as long as desired, for example until, in a final ventilation state, only the ambient pressure prevails within the pneumatic system. Accordingly, it is possible both for a ventilation cross section to be adjusted, that is to say for a selection to be made as regards whether the second ventilation valve should be utilized, and for a duration for said ventilation process to be predefined.

Such an individual adjustment of the compressed-air feed system may be of interest for example if it is sought to control the compressed air within a vehicle without a delay. This may be relevant for an immediate lowering of a vehicle for the purposes of easy boarding, or for an asymmetrical lowering of a vehicle for show purposes.

It is furthermore advantageous that known compressed-air feed systems from the prior art can be easily converted to form a compressed-air feed system according to the invention. This requires merely an attachment of a second ventilation line and a second ventilation valve.

In the context of the invention, an operating mode can refer, inter alia, to a setting of the valves of the compressed-air feed system, or a predefined sequence of positions of the valves. A further important manipulated variable of the compressed-air feed system for the definition of an operating mode may be an adjustable throttle width of the ventilation throttle.

According to a second aspect of the invention, a pneumatic system is provided having a compressed-air feed system according to the first aspect of the invention. The pneumatic system is formed as an air suspension system which has a gallery and at least one first branch line, which is pneumatically connected to the gallery and which has a bellows, and/or a second branch line, which is pneumatically connected to the gallery and which has a compressed-air reservoir, and having a first directional valve connected upstream of the bellows and/or a second directional valve connected upstream of the compressed-air reservoir.

According to a third aspect of the invention, a method is provided for operating a pneumatic system, in particular an air suspension system of a vehicle, in particular by means of a compressed-air feed system according to the first aspect of the invention. The method according includes the following steps: filling the pneumatic system by means of a compressed-air flow, conducted via a pneumatic main line, from the compressed-air feed system, in particular during an automatic opening of a check valve in the pneumatic main line; maintaining the pressure in the pneumatic system, wherein the pneumatic main line is shut off, in particular by means of the check valve, for prevention of a compressed-air flow out of the pneumatic system, and ventilating the pneumatic system by means of the compressed-air flow, conducted via the pneumatic main line, out of the pneumatic system via a first ventilation valve, which is connected to a ventilation throttle, and/or via an additional second ventilation valve, in particular during an unblocking of the check valve in the pneumatic main line, wherein, in at least one operating mode of the compressed-air feed system, the second ventilation valve is open over a predetermined time period of a ventilation process.

The method according to the third aspect of the invention has the same advantages as the compressed-air feed system according to the first aspect of the invention, because the compressed-air feed unit according to the first aspect leads to the method according to the third aspect.

According to a fourth aspect, the invention relates to a device for open-loop and/or closed-loop control of a compressed-air feed system and/or of a pneumatic system in accordance with a method according to the third aspect of the invention.

The device for open-loop and/or closed-loop control of a compressed-air feed system and/or of a pneumatic system according to the fourth aspect of the invention has the same advantages as the compressed-air feed system according to the first aspect of the invention, because the compressed-air feed unit leads to the program according to the fourth aspect.

Here, the device for the open-loop and/or closed-loop control may be implemented in a computer which is situated in the vehicle in which the corresponding method for operating a pneumatic system is realized. Alternatively, the computer may be situated in an external unit, which, for example via a radio connection, actuates a compressed-air feed system which carries out the method for operating a pneumatic system. Here, the program is configured such that the computer that executes the program controls a position of the respective valves of the compressed-air feed unit and/or of the pneumatic system.

Preferred refinements of the compressed-air feed system according to the first aspect of the invention will be described below.

In particular, the first ventilation line and the second ventilation line are connected to the same ventilation connection.

In one refinement, the pneumatic main line furthermore has a check valve.

In one refinement, the additional, second ventilation valve of the compressed-air feed system is a check valve. In this way, in this refinement, it is advantageously possible for a pressure which is too high for the functioning of the compressed-air feed system to be avoided within the compressed-air feed system. Here, in a particularly advantageous variant of this refinement, a spring force of a spring which closes the check valve is selected such that the check valve, in the absence of corresponding actuation, opens if the pressure within the compressed-air feed system lies close to a pressure value which is critical for the functioning of the compressed-air feed system. It is basically possible for the check valve to be unblocked in an expedient manner in accordance with demand. An unblocking line is preferably connected to the unblockable check valve. Said unblocking line may basically, in accordance with requirements, be an expediently designed control line, for example an electrical, magnetic or pneumatic control line, which is suitable for actuating the check valve such that the latter is unblocked.

Furthermore, in one refinement of the compressed-air feed system, the second ventilation line permits a larger minimum flow cross section of a throughflowing compressed-air flow than the first ventilation line. In particular, it is advantageous for the ventilation throttle to have a larger nominal width than the regeneration throttle.

The minimum flow cross section corresponds to the flow cross section at that component of a respective ventilation line which has the smallest nominal width. In this preferred refinement, the second ventilation line can be utilized for a faster ventilation than the second ventilation duct. In a variant of this refinement, the minimum flow cross section of the second ventilation line is at least 1.5 times as large, preferably twice as large, preferably at least three times as large, as the minimum flow cross section of the first ventilation line. In one variant of this refinement, the minimum flow cross sections of the first ventilation line and of the second ventilation line are controllable. Thus, in addition to the control as regards which ventilation line is to be used, it is also possible for a flow cross section to be determined, whereby a rate of ventilation of the pneumatic system can be controlled in finely graduated fashion in an effective manner. This is for example realized, in one variant, by means of a first controllable ventilation throttle in the first ventilation line and a second controllable ventilation throttle in the second ventilation line. Here, the first controllable ventilation throttle and the first ventilation throttle may be identical.

In one refinement according to the first aspect of the invention, the first ventilation line and the second ventilation line are connected to the same ventilation connection. The compressed-air feed system according to this refinement is thus of particularly compact construction, because there is no need to use two ventilation connections for the ventilation of compressed air. In a preferred variant of this refinement, a compressed-air supply connection is identical to the ventilation connection, such that the compressed-air supply is connected to the ventilation connection. In this way, it is possible for material for components of the compressed-air feed system to be saved. It is furthermore thereby additionally possible for space to be saved within a vehicle equipped with the compressed-air feed system.

In a particularly preferred refinement, the predetermined time period in which the second ventilation valve is open is, in at least one operating mode, the entire time period of the ventilation process. In this way, a particularly fast ventilation can be possible in said operating mode.

In a preferred refinement, the compressed-air feed system is designed to provide a first operating mode in which only the first ventilation valve is open, such that the pneumatic system can be ventilated exclusively via the ventilation throttle. In this way, with the compressed-air feed system according to the invention, in said first operating mode, ventilation of the compressed-air feed system can be performed in the manner known from the prior art.

In a further preferred refinement, the compressed-air feed system is designed to provide a second operating mode in which the first ventilation valve and the second ventilation valve are at least temporarily simultaneously open, such that the pneumatic system can be ventilated over the predetermined time period, in particular over the entire time period, of the ventilation process via the first ventilation line and the second ventilation line. In one variant of this refinement, the second ventilation line has at least twice as large a minimum flow cross section of a throughflowing compressed-air flow as the first ventilation line. Consequently, a considerably faster ventilation of the compressed-air feed system is possible in the second operating mode than in the first operating mode.

Furthermore, in a further refinement, the compressed-air feed system has a third operating mode in which only the second ventilation valve is open, such that the pneumatic system can be ventilated exclusively via the second ventilation throttle.

In a particularly preferred refinement, for the realization of a ventilation process in the compressed-air feed system, it is possible for a selection to be made between the three operating modes or between the first and the third operating mode, or between the first and the second operating mode. A selection of the operating mode is preferably performed in automated fashion in a manner dependent on a respective action of a user of the compressed-air feed system. For example, the opening of a door may lead to an activation of the second or third operating mode, in order that the vehicle can be quickly lowered for convenient boarding. The selection of the respective operating mode is, in a further variant of this refinement, performed by means of an external unit by means of which a user input that implies an operating mode can be received and transmitted.

In one refinement of the compressed-air feed system, a check valve in the pneumatic main line is a 4/2 directional valve, which controls a ventilation of the first ventilation line. This is advantageous because, in this way, a compact combination of check valve from the pneumatic main line and first ventilation valve from the first ventilation line is possible, as will be discussed in more detail below on the basis of the embodiments of the compressed-air feed system illustrated in the figures. In another refinement, a valve in the pneumatic main line is formed as a magnetic valve. In another preferred refinement, a valve in the pneumatic main line is formed as a pneumatic relay valve, which is switched by means of a further magnetic valve in a secondary line with a small nominal width. In one refinement, the pneumatic main line has a check valve, a magnetic valve or a pneumatic relay valve.

In one refinement, the second and/or another operating mode is provided such that the first ventilation valve is opened at a time t1 and that the second ventilation valve is opened at a time t2, and that the time t1 precedes the time t2. In this way, an abrupt ventilation sound can be ventilated by the first ventilation valve, such that a switch can thereupon be made to a faster ventilation without an abrupt ventilation sound by means of the second ventilation valve.

In one refinement, the compressed-air feed system furthermore has a compressed-air reservoir which is connected via a filling valve to the pneumatic main line and which is designed to, in the presence of a boost mode of the compressed-air feed system, fill the pneumatic system with compressed air via the filling valve. In the light of the present invention, this is particularly advantageous because, owing to the presence of the first ventilation valve and of the second ventilation valve, a particularly fast ventilation is possible, such that a fast refilling of the pneumatic system may be desirable. Fast filling after a ventilation process may be necessary in order, in the event of a ventilation to below a desired air pressure level within the pneumatic system, to provide the desired air pressure level quickly. Furthermore, fast filling after a ventilation process may be necessary in order to restore a driving capability of the vehicle that has the pneumatic system, for example after a lowering of the vehicle or of one vehicle side in order to permit comfortable boarding of the vehicle.

In one refinement according to the first aspect of the invention, the compressed-air feed systems furthermore has a two-stage compressor which is connected both to the compressed-air supply and to the pneumatic main line and which is designed to, in a corresponding further operating mode of the compressed-air feed system, fill the pneumatic system with compressed air. Fast filling of the pneumatic system which is made possible in this refinement permits a fast correction of the air pressure level in the pneumatic system after the particularly fast ventilation process that can be realized by means of the invention. In one variant of this refinement, the two-stage compressor is an alternative or an addition to the air pressure reservoir for the filling of the pneumatic system from the refinement from the previous section.

In one refinement, all of the valves of the compressed-air feed system are electromagnetically controllable, such that they can be actuated, and varied in terms of their respective position, by means of an electrical control system.

The open-loop and closed-loop control takes into consideration the regeneration of the drying agent, with specification of regeneration cycles to be implemented.

Preferred refinements of the pneumatic system according to the second aspect of the invention will be described below.

In one refinement of the pneumatic system, the air suspension system comprises a number of bellows, wherein each bellows is assigned a first directional valve connected upstream. Each bellows can be individually aerated and ventilated by means of the first directional valve assigned to the respective bellows. In particular, by means of the compressed-air feed system according to the invention, each bellows can be individually very quickly ventilated. In this refinement, by means of different ventilation of the pneumatics of different bellows, the vehicle that has the compressed-air feed system can also be lowered on one side, in particular on the left side or right side. Accordingly, in one variant of this refinement, a vehicle is always lowered on the side on which a door for boarding is opened. This may be realized for example by means of a sensor system which is functionally connected to the pneumatic system, wherein the sensor system has sensors which transmit a sensor signal when a door of the vehicle is opened.

Preferred refinements of the method for operating a pneumatic system according to the third aspect of the invention will be described below.

In one refinement of the method, the ventilation takes place, in a first operating mode, only via the first ventilation valve, such that the pneumatic system is ventilated exclusively via the ventilation throttle.

In a further refinement of the method, the ventilation takes place, in a second operating mode, via the first ventilation valve and the second ventilation valve simultaneously.

In one refinement of the method, the ventilation takes place, in a third operating mode, only via the second ventilation valve.

In a further refinement, one step of the method consists in a selection of the operating mode, wherein, in the context of a ventilation of the pneumatic system, a selection can be made between the first operating mode, the second operating mode and the third operating mode, or a selection can be made between the first and the second operating mode, or a selection can be made between the first and the third operating mode.

In a preferred refinement, the ventilation in the second and/or another operating mode takes place such that the first ventilation valve is opened at a time t1 and that the second ventilation valve is opened at a time t2, and that the time t1 precedes the time t2.

In one refinement of the method, a first step consists in a provision of a first ventilation line with the first ventilation valve and of a second ventilation line with the second ventilation valve, wherein the second ventilation line permits a larger minimum flow cross section of a throughflowing compressed-air flow than the first ventilation line.

FIG. 1 shows a first embodiment of a compressed-air feed system 10 according to a first aspect of the invention, having a two-stage compressor 51, having a 4/2 directional check valve as first ventilation valve 73, and having a 2/2 directional check valve as second ventilation valve 73'.

In the first embodiment, the compressed-air feed system 10 is designed to be utilized for operating a pneumatic system, in particular an air suspension system of a vehicle. For this purpose, the compressed-air feed system has a compressed-air supply 1, a compressed-air connection 2 to the pneumatic system (not illustrated in FIG. 1), a ventilation connection 3 to the surroundings 5, and a pneumatic main line 60. For this purpose, the pneumatic main line 60 is arranged between the compressed-air supply 1 and the compressed-air connection 2 and has an air dryer 61, a regeneration throttle 62 and a check valve 63, which is provided optionally in this embodiment. Formed between the pneumatic main line 60 and the ventilation connection 3 is a first ventilation line 70, which has a ventilation throttle 72 and the first ventilation valve 73. In this embodiment, the first ventilation valve 73 is formed as a pneumatic valve. Furthermore, between the compressed-air connection 2 and the ventilation connection 3, there is arranged a second ventilation line 70', which has an additional, second ventilation valve 73' which is formed as a 2/2 directional valve. An actuation (not illustrated in FIG. 1) of the second ventilation valve 73' is realized such that said valve 73' is, in at least one operating mode of the compressed-air feed system 10, open over a predetermined, preferably over an entire, time period of a ventilation process. In this embodiment, the second ventilation valve 73' is formed as an electrical valve. In other embodiments which are not illustrated, said second ventilation valve is provided as a pneumatic valve.

By means of an air compressor formed as a two-stage compressor 51, an aeration by means of the compressed-air feed system 10 is accelerated in relation to the use of a single compressor. The two-stage compressor 51 is, for this purpose, connected both to the compressed-air supply 1 and to the pneumatic main line 60. In this way, in the presence of a corresponding operating mode, said two-stage compressor can fill the pneumatic system, which is connected to the compressed air feed system 10, with compressed air in a particularly effective manner.

By virtue of the fact that the ventilation connection 3 is used for the ventilation of the first ventilation line 70 and of the second ventilation line 70', and is furthermore also connected to an air supply 0 for the filling of the pneumatic system with compressed air, the compressed-air feed system 10 of this first embodiment makes do with particularly few components, and only one air filter 0.1 needs to be used, which is installed directly at the ventilation connection 3.

The first ventilation valve 73 is a 4/2-way valve and, in a first position, leaves the first ventilation line 70 closed and forms the check valve 63 in the pneumatic main line 60. Said check valve 63 opens, in accordance with a spring force within the check valve 63, in the presence of a suitably high filling pressure from the two-stage compressor 51, and thereby permits filling of the pneumatic system connected to the compressed-air feed system 10. In a second position of the first ventilation valve 73, the first ventilation line 70 is open for an air flow in the direction of the ventilation connection 3, that is to say during a ventilation, and the check valve 63 in the pneumatic main line 60 is replaced by a valve which permits an air flow in the direction of the air dryer 61, which is likewise the case for a ventilation.

An actuation of the first ventilation valve 73 for setting the position may be realized by means of an electromagnetic signal which is transmitted by a controller (not illustrated) of the compressed-air feed system 10.

In the pneumatic main line 60, the regeneration throttle 62 is situated in a ventilation path of the compressed air for a ventilation through the first ventilation line 70, wherein the regeneration throttle 62 has a nominal width between 0.5 mm and 4 mm, preferably 1.5 mm. Situated in the first ventilation duct 70 is the ventilation throttle 72, which has a nominal width of between 2.6 mm and 8 mm, preferably of 3.6 mm, such that the regeneration throttle 62 effects a limitation of the ventilation flow through the first ventilation line 70 by means of a minimum flow cross section 74 for an air flow through the first ventilation line 70.

The additional, second ventilation valve 73' in the second ventilation line 70' is a 2/2-way valve which, in a first position, is formed as a check valve 63'. In an embodiment which is not illustrated, the pneumatic main line (60) has a magnetic valve or a pneumatic relay valve. In a manner dependent on a spring force of a spring which closes the check valve 63', a ventilation pressure of adequate magnitude can lead to an opening of the check valve. In this way, in the presence of an excessively high pressure in the compressed-air feed unit 10, compressed air is automatically conducted to the ventilation connection 3, without the need for an actuation of valves 73, 73'. In a second position of the second ventilation valve 73', the second ventilation line 70' is open for air flows in a ventilation direction. Here, the second ventilation valve 73' has, in the second position, a nominal width 74' of for example between 1 mm and 4 mm, preferably of 2 mm. Consequently, the second ventilation valve 73' can be used for a ventilation of the pneumatic system which is connected to the compressed-air feed system 10 via the compressed-air connection 2.

An actuation of the second ventilation valve 73' for setting a switching position is realized by means of an electromagnetic signal which is transmitted by a controller (not illustrated) of the compressed-air feed system 10.

A comparison of the above-stated nominal widths 74, 74' shows that, in the compressed-air feed system 10, a ventilation of the pneumatic system takes place considerably more slowly through the first ventilation line 70 than through the second ventilation line 70'. Consequently, in a manner dependent on a desired operating mode, a very fast ventilation of the pneumatic system can take place via the second ventilation line 70', or a slower and thus more controlled ventilation can take place via the first ventilation line 70. Alternatively, a ventilation may also take place via both ventilation lines 70, 70', and consequently particularly quickly.

One possible use of the first embodiment of the compressed-air feed air system 10 is such that the relatively slow ventilation via the first ventilation line 70 takes place as a vehicle equipped with the pneumatic system is traveling. By contrast, the relatively fast ventilation via the second ventilation line 70' effects a relatively fast lowering of a stationary vehicle equipped with the pneumatic system, for example in order to permit more convenient boarding of the vehicle.

Figure 2:
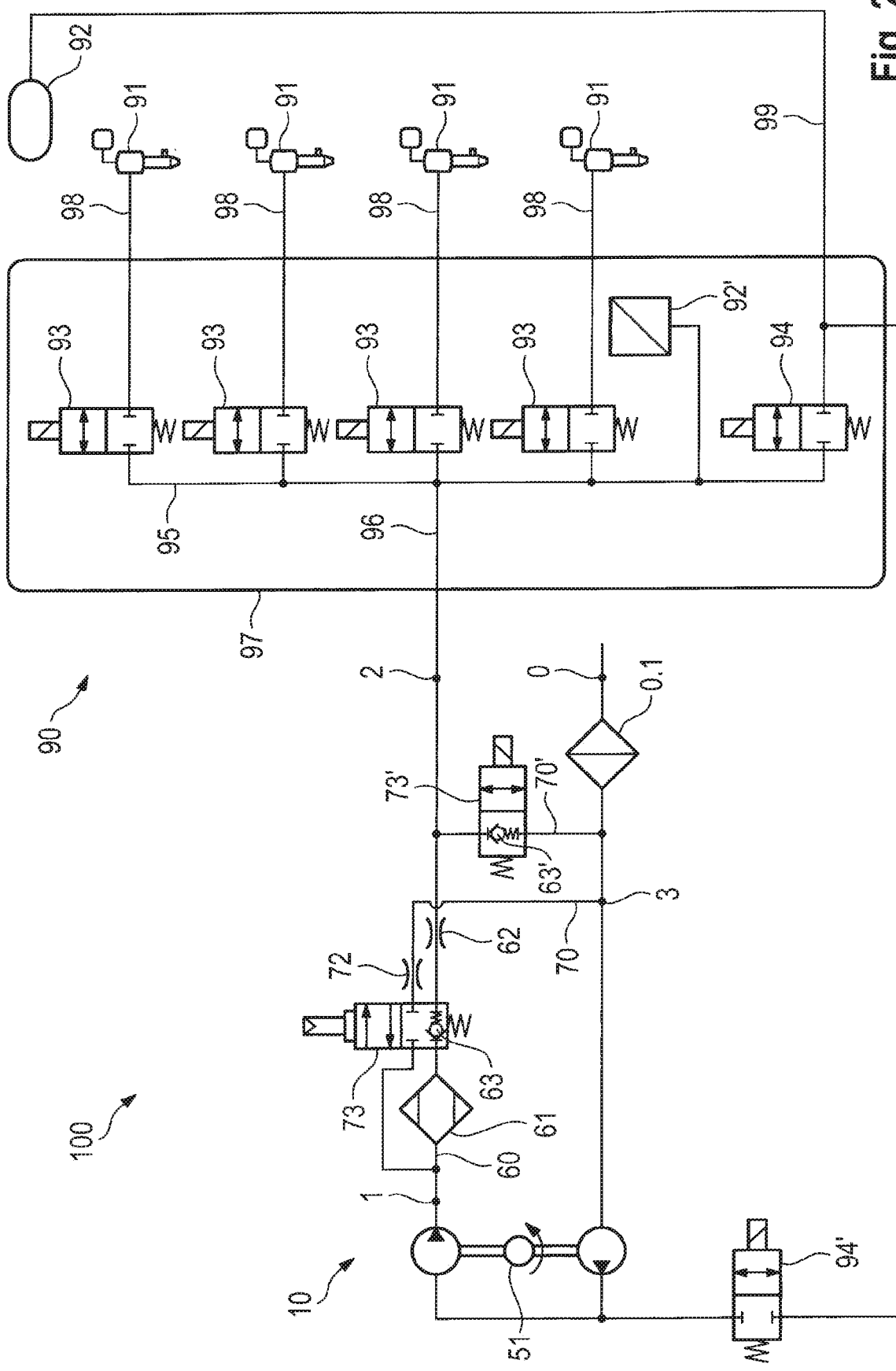
FIG. 2 shows an embodiment of a pneumatic system according to a second aspect of the invention, having a compressed-air system according to the first embodiment and having a pneumatic system with a compressed-air reservoir and with a directional valve connected upstream at each bellows.

FIG. 2 shows an embodiment of a pneumatic system 100 according to a second aspect of the invention, having a compressed-air system 10 according to the first embodiment and having a pneumatic system 90 with a compressed-air reservoir 92 and with a directional valve 93 connected upstream at each bellows 91.

The compressed-air feed system 10 is of identical design to the first embodiment shown in FIG. 1. Also schematically illustrated is the pneumatic system 90 connected to the compressed-air connection 2. The pneumatic system 90 is in the form of an air suspension system.

In this case, the air suspension system has a number of four so-called bellows 91, which are assigned in each case to one wheel of the vehicle (not illustrated in any more detail) and form an air spring of the vehicle. Furthermore, the air suspension system has a compressed-air reservoir 92 for storing rapidly available compressed air for the bellows 91. Connected upstream of the bellows 91 is in each case one first directional valve 93, which is formed as a magnetic valve in a first branch line 98 formed as a spring branch line and which serves in each case as a ride-height control valve for opening and closing an air spring formed with a bellows 91. The magnetic valves 93 in the spring branch lines 98 are formed as 2/2 directional valves. Connected upstream of the compressed-air reservoir 92, in a second branch line 99 formed as a reservoir branch line, there is a second directional valve 94, which is formed as a magnetic valve and which is in the form of a further 2/2 directional valve, as reservoir valve. The magnetic valves 93, 94 are connected to a common manifold line, a pneumatic line which forms gallery 95. The gallery 95 is pneumatically connected via a further pneumatic line 96, for forming a pneumatic interconnection, to a compressed-air connection 2 of the compressed-air feed system 10. In the present case, the magnetic valves 93, 94 are arranged in a valve block 97 with five valves. The magnetic valves 93, 94 are shown in FIG. 2 in an electrically deenergized state—here, the magnetic valves 93, 94 are formed as magnetic valves which are closed when electrically deenergized.

Also provided in the pneumatic system 90 is a stress/pressure sensor 92', which can measure a pressure in the gallery 95 of the pneumatic system 90. The pressure is transmitted to a controller (not illustrated in FIG. 2) of the pneumatic system, which controller controls, or can control, the valves 73, 73', 93, 94 of the pneumatic system inter alia in a manner dependent on the measured pressure.

Other embodiments (not shown here) may realize a different arrangement of the magnetic valves 93, 94—it is also possible for fewer magnetic valves to be utilized within the valve block.

In particular, the isolating valve arranged as a check valve 63 in the pneumatic main line 60 does not necessarily need to be arranged in the compressed-air feed system 10 in the case of an embodiment which is not shown here. Rather, an isolating valve may also be arranged in the pneumatic system 90, for example also within the valve block 97.

In addition to the reservoir valve 94 formed as magnetic valve, the compressed-air reservoir 92 is also connected via a filling valve 94' to the pneumatic main line 60 of the compressed-air feed system. A flow of compressed air from the compressed-air reservoir 92 that is thus made possible can be additionally compressed by the two-stage compressor 51 before passing via the compressed-air supply 1 into the pneumatic main line 60, which results in a particularly effective and fast filling of the pneumatic system 90 with compressed air. It is thus possible in the illustrated embodiment of the pneumatic system to select between filling of the pneumatic system via the reservoir valve 94 and filling via the filling valve 94'.

Figure 3:
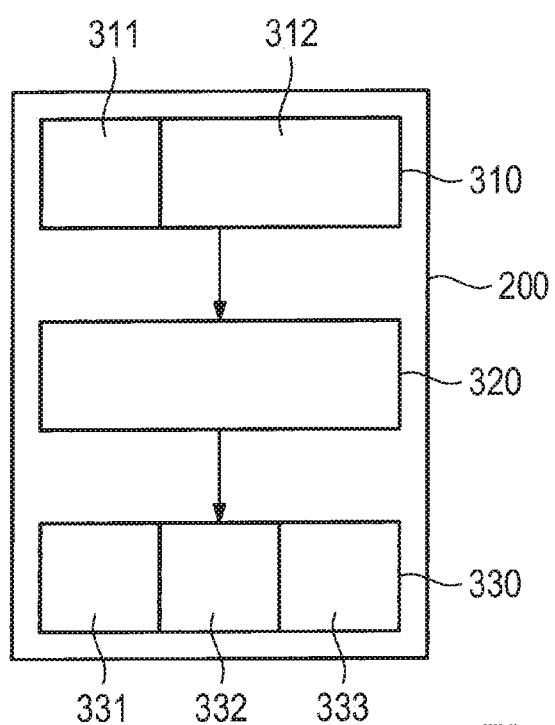
FIG. 3 shows an embodiment of a device according to a fourth aspect of the invention, which device is designed to control, in open-loop and/or closed-loop fashion, an embodiment of a method for operating a pneumatic system, in particular an air suspension system of a vehicle, in accordance with a third aspect of the invention.

FIG. 3 shows an embodiment of a device (200) according to a fourth aspect of the invention. The device (200) is designed to control, in open-loop and/or closed-loop fashion, an embodiment of a method for operating a pneumatic system, in particular an air suspension system of a vehicle, in accordance with a third aspect of the invention. The method comprises the steps stated below.

In a first step 310 of the method, the pneumatic system is filled by means of a compressed-air flow, conducted via a pneumatic main line, from the compressed-air feed system. Here, the device (200) is designed to provide both a boost mode (311) and also at least one further operating mode (312) for filling the pneumatic system.

In the next step 320, the pressure in the pneumatic system is maintained, wherein the pneumatic main line is shut off for prevention of a compressed-air flow out of the pneumatic system.

A final step 330 of the method comprises a ventilation of the pneumatic system by means of the compressed-air flow, conducted via the pneumatic main line, out of the pneumatic system via a first ventilation valve, which is connected to a ventilation throttle, and/or via an additional, second ventilation valve, wherein, in at least one operating mode (331, 332, 333) of the compressed-air feed system, the second ventilation valve is open over a predetermined time period of a ventilation process. The device (200) is designed to provide a first (331), a second (332) and a third operating mode (333) for this purpose.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS 0.1 Air filter
0 Air supply
1 Compressed-air supply
2 Compressed-air connection
3 Ventilation connection
5 Surroundings
10 Compressed-air feed system
51 Two-stage compressor
60 Pneumatic main line
61 Air dryer
62 Regeneration throttle
63 Check valve
63' Check valve of the second ventilation line
70 First ventilation line
70' Second ventilation line
72 Ventilation throttle
73 First ventilation valve
73' Second ventilation valve
74 Flow cross section of the first ventilation line
74' Flow cross section of the second ventilation line
90 Pneumatic system
91 Bellows
92 Compressed-air reservoir
92' Stress/pressure sensor
93 First directional valve
94 Second directional valve, reservoir valve
94' Filling valve
95 Gallery
96 Further pneumatic line
97 Valve block
98 First branch line, spring branch line
99 Second branch line, reservoir branch line
100 Pneumatic system
200 Device
310 First step of the method
311 Boost mode
312 Filling operating mode
320 Next step of the method
330 Final step of the method
331 First operating mode
332 Second operating mode
333 Third operating mode

The invention claimed is:
1. A compressed-air feed system for operating a pneumatic system, comprising:
 a compressed-air supply;
 a compressed-air connection to the pneumatic system;
 at least one ventilation connection to surroundings;
 a pneumatic main line between the compressed-air supply and the compressed-air connection, the pneumatic main line having an air dryer and a regeneration throttle;

a first ventilation line between the pneumatic main line and the at least one ventilation connection, the first ventilation line having a first ventilation valve and a ventilation throttle, the first ventilation valve being a 4/2 directional valve; and a second ventilation line between the compressed-air connection and the at least one ventilation connection, the second ventilation line having a second ventilation valve formed as a 2/2 directional valve, the 2/2 directional valve being configured, in a first position, as a check valve, wherein the second ventilation line permits a larger minimum flow cross section of a throughflowing compressed-air flow than the first ventilation line, and wherein the compressed-air feed system is designed to provide at least one operating mode in which the second ventilation valve is open over a predetermined time period of a ventilation process.

2. The compressed-air feed system as claimed in claim 1, wherein the predetermined time period is an entire time period of the ventilation process.

3. The compressed-air feed system as claimed in claim 1, wherein the first ventilation line and the second ventilation line are connected to a same ventilation connection of the at least one ventilation connection.

4. The compressed-air feed system as claimed in claim 1, wherein the at least one operating mode includes an operating mode in which the first ventilation valve and the second ventilation valve are at least temporarily simultaneously open, such that the pneumatic system can be ventilated over the predetermined time period of the ventilation process via the first ventilation line and the second ventilation line.

5. The compressed-air feed system as claimed in claim 4, wherein the operating mode in which the first ventilation valve and the second ventilation valve are at least temporarily simultaneously open is an operating mode in which the first ventilation valve is opened at a time t1 and the second ventilation valve is opened at a time t2, the time t1 preceding the time t2.

6. The compressed-air feed system as claimed in claim 1, wherein the at least one operating mode includes an operating mode in which only the second ventilation valve is open, such that the pneumatic system can be ventilated exclusively over an entire time period of the ventilation process via the second ventilation line.

7. The compressed-air feed system as claimed in claim 1, further comprising a compressed-air reservoir connected via a filling valve to the pneumatic main line and configured to, in the presence of a boost mode of the compressed-air feed system, fill the pneumatic system with compressed air via the filling valve and the pneumatic main line.

8. The compressed-air feed system as claimed in claim 1, further comprising a two-stage compressor connected both to the air supply and to the pneumatic main line and configured to, in a corresponding filling operating mode of the compressed-air feed system, fill the pneumatic system with compressed air.

9. A pneumatic system comprising:
the compressed-air feed system as claimed in claim 1; and
a pneumatic system formed as an air suspension system having a gallery and at least one first branch line, which is pneumatically connected to the gallery and which has a bellows, and/or a second branch line, which is pneumatically connected to the gallery and which has a compressed-air reservoir, and having a first directional valve connected upstream of the bellows and/or a second directional valve connected upstream of the compressed-air reservoir.

10. The compressed-air feed system as claimed in claim 1, wherein the first ventilation valve is configured to, in a first position, simultaneously close the first ventilation line and form a check valve in the pneumatic main line, and wherein the first ventilation valve is further configured to, in a second position, provide a flow path from the compressed-air connection through the air dryer in the pneumatic main line and to the first ventilation line.

11. The compressed-air feed system as claimed in claim 10, wherein the second ventilation valve is configured to, in a first position, form a check valve in the second ventilation line, and wherein the second ventilation valve is further configured to, in a second position, open the second ventilation line to allow flow between the compressed-air connection and the at least one ventilation connection.

12. The compressed-air feed system as claimed in claim 11, wherein the check valve in the pneumatic main line formed by the first ventilation valve in the first position prevents flow in a direction from the compressed-air connection to the compressed-air supply and allows flow in a direction from the compressed-air supply to the compressed-air connection when a high filling pressure exceeds a first spring force, and wherein the check valve in the second ventilation line formed by the second ventilation valve in the first position prevents flow in a direction from the ventilation connection to the compressed-air connection and allows flow in a direction from the compressed-air connection to the ventilation connection when a ventilation pressure exceeds a second spring force.

13. A method for operating a compressed-air feed system, the method comprising:
filling a pneumatic system via a compressed-air flow conducted via a pneumatic main line from a compressed-air feed system;
maintaining a pressure in the pneumatic system, wherein the pneumatic main line is shut off for prevention of a compressed-air flow out of the pneumatic system; and
ventilating the pneumatic system by the compressed-air flow conducted via the pneumatic main line out of the pneumatic system via a first, 4/2 directional ventilation valve arranged in a first vent line that includes a ventilation throttle, and further via a second ventilation valve arranged in a second vent line,
wherein the second vent line permits a larger minimum flow cross section of a throughflowing compressed-air flow than the first vent line.

14. The method as claimed in claim 13, wherein the ventilating the pneumatic system via the first ventilation valve and further via the second ventilation valve is performed with the first ventilation valve and second ventilation valve open simultaneously over a predetermined time period of a ventilation process.

15. The method as claimed in claim 14, wherein the predetermined time period is an entire time period of the ventilation process.

16. The method as claimed in claim 13, further comprising ventilating the pneumatic system exclusively via the second ventilation valve.

17. The method as claimed in claim 13, the ventilating the pneumatic system via the first ventilation valve and further via the second ventilation valve is performed such that the first ventilation valve is opened at a time t1 and that the second ventilation valve is opened at a time t2, the time t1 preceding the time t2.

18. A device for open-loop and/or closed-loop control of a compressed-air feed system and/or of a pneumatic system in accordance with the method as claimed in claim 13.

19. A compressed-air feed system for operating a pneumatic system, comprising:
a compressed-air supply;
a compressed-air connection to the pneumatic system;
a ventilation connection to surroundings;
a pneumatic main line between the compressed-air supply and the compressed-air connection, the pneumatic main line having an air dryer and a regeneration throttle;
a first ventilation line between the pneumatic main line and the ventilation connection,
a 4/2-way valve including first and second ports disposed in the pneumatic main line and further including third and fourth ports disposed in the first ventilation line;
a second ventilation line between the compressed-air connection and the at least one ventilation connection; and
a 2/2-way valve including first and second ports disposed in the second ventilation line,
wherein the 4/2-way valve is configured to:
in a first position, prevent flow between the third and fourth ports of the 4/2-way valve and form a check valve between the first and second ports of the 4/2-way valve, and
in a second position, allow flow between the first and second ports of the 4/2-way valve and between the third and fourth ports of the 4/2-way valve so as to provide a flow path from the compressed-air connection through the air dryer in the pneumatic main line and through the first ventilation line to the ventilation connection.

20. The compressed-air feed system as claimed in claim 19, wherein the 2/2-way valve is configured to:
in a first position, form a check valve between the first and second ports of the 2/2-way valve, and
in a second position, allow flow between the first and second ports of the 2/2-way valve so as to open the second ventilation line to allow flow between the compressed-air connection and the at least one ventilation connection.

\* \* \* \* \*